(12) United States Patent  (10) Patent No.: US 6,624,988 B2
Gill  (45) Date of Patent: Sep. 23, 2003

(54) TUNNEL JUNCTION SENSOR WITH ANTIPARALLEL (AP) COUPLED FLUX GUIDE

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 09/814,496

(22) Filed: Mar. 20, 2001

(65) Prior Publication Data

US 2002/0135949 A1 Sep. 26, 2002

(51) Int. Cl.[7] .......................... G11B 5/127; G11B 5/33; G11B 5/39
(52) U.S. Cl. ..................... 360/324.2; 360/321
(58) Field of Search .................. 360/324.2, 321, 360/324, 313, 110

(56) References Cited

U.S. PATENT DOCUMENTS

| 5,291,363 A | * | 3/1994 | Somers | 360/321 |
| 5,483,403 A | * | 1/1996 | Voegeli | 360/321 |
| 5,666,248 A | * | 9/1997 | Gill | 360/324.1 |
| 5,936,402 A | | 8/1999 | Schep et al. | 324/252 |
| 5,966,012 A | | 10/1999 | Parkin | 324/252 |
| 2001/0026423 A1 | * | 10/2001 | Arai et al. | 360/321 |

* cited by examiner

Primary Examiner—Julie Anne Watko
(74) Attorney, Agent, or Firm—Ervin F. Johnston (57) ABSTRACT

A read head, which can be submicron, has an antiparallel (AP) coupled flux guide which is located at an air bearing surface and guides field signals from a rotating magnetic disk to a tunnel junction sensor which is recessed in the head. Because of the highly stable characteristics of the AP flux guide, first and second hard bias layers at the side edges of the flux guide are not required in order to stabilize the magnetization of the flux guide. The AP flux guide has first and second AP layers with oppositely oriented magnetizations so that the flux guide has a net magnetization which is the difference between the magnetizations of the first and second AP layers. These thicknesses are designed to provide a desired uniaxial anisotropy $H_K$ and magnetic softness of the AP flux guide.

20 Claims, 5 Drawing Sheets

TUNNEL JUNCTION SENSOR WITH ANTIPARALLEL (AP) COUPLED FLUX GUIDE

BACKGROUND OF THE INVENTION

1. Field of the Invention

The present invention relates to a tunnel junction sensor with an antiparallel (AP) coupled flux guide wherein the flux guide does not require stabilization by hard bias layers.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a tunnel junction sensor for sensing the magnetic signal fields from the rotating magnetic disk. The sensor includes an insulative tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel junction sensor is located between ferromagnetic first and second shield layers. First and second leads, which may be the first and second shield layers, are connected to the tunnel junction sensor for conducting a sense current therethrough. The sense current is conducted perpendicular to the major film planes (CPP) of the sensor as contrasted to a spin valve sensor where the sense current is conducted parallel to the major film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, is when the sense current is conducted through the sensor without magnetic field signals from the rotating magnetic disk.

When the magnetic moments of the pinned and free layers are parallel with respect to one another the resistance of the tunnel junction sensor to the sense current ($I_S$) is at a minimum and when their magnetic moments are antiparallel the resistance of the tunnel junction sensor to the sense current ($I_S$) is at a maximum. Changes in resistance of the tunnel junction sensor is a function of cos θ, where θ is the angle between the magnetic moments of the pinned and free layers. When the sense current ($I_S$) is conducted through the tunnel junction sensor, resistance changes, due to signal fields from the rotating magnetic disk, cause potential changes that are detected and processed as playback signals. The sensitivity of the tunnel junction sensor is quantified as magnetoresistive coefficient dr/R where dr is the change in resistance of the tunnel junction sensor from minimum resistance (magnetic moments of free and pinned layers parallel) to maximum resistance (magnetic moments of the free and pinned layers antiparallel) and R is the resistance of the tunnel junction sensor at minimum resistance. The dr/R of a tunnel junction sensor can be on the order of 40% as compared to 10% for a spin valve sensor.

The first and second shield layers may engage the bottom and the top respectively of the tunnel junction sensor so that the first and second shield layers serve as leads for conducting the sense current Is through the tunnel junction sensor perpendicular to the major planes of the layers of the tunnel junction sensor.

The tunnel junction sensor has first and second side surfaces which are normal to the ABS. First and second hard bias layers abut the first and second side surfaces respectively of the tunnel junction sensor for longitudinally biasing the magnetic domains of the free layer. This longitudinal biasing maintains the magnetic moment of the free layer parallel to the ABS when the read head is in a quiescent condition.

Magnetic head assemblies, wherein each magnetic head assembly includes a read head and a write head combination, are constructed in rows and columns on a wafer. After completion at the wafer level, the wafer is diced into rows of magnetic head assemblies and each row is lapped by a grinding process to lap the row to a predetermined air bearing surface (ABS). In a typical tunnel junction read head all of the layers are exposed at the ABS, namely first edges of each of the first shield layer, the seed layer, the free layer, the barrier layer, the pinned layer, the pinning layer and the second shield layer. Opposite edges of these layers are recessed in the head. The barrier layer is a very thin layer, on the order of 20 Å, which places the free and pinned layers very close to one another at the ABS. When a row of magnetic head assemblies is lapped there is a high risk of magnetic material from the free and pinned layers being smeared across the ABS to cause a short therebetween. Accordingly, there is a strong-felt need to construct magnetic head assemblies with tunnel junction heads without the risk of shorting between the free and pinned layers at the ABS due to lapping.

A scheme for preventing shorts across the barrier layer of the tunnel junction sensor is to recess the tunnel junction sensor within the head and provide a flux guide between the ABS and the sensor for guiding flux signals from the rotating magnetic disk. Typically, the ferromagnetic material of the flux guide is required to be stabilized by hard bias layers on each side of the flux guide. With track widths of 1 μm or more this stabilization of the flux guide has been acceptable. However, with submicron track widths, such as 0.1 μm to 0.2 μm, the hard biasing of the flux guide renders the magnetization of the flux guide too stiff to adequately respond to flux signals from the rotating magnetic disk. The reason for this is because flux guides, regardless of the track width, are magnetically stiffened about 0.1 μm on each side of the flux guide by the hard biasing layers. When the track width is above 1 μm, this does not render the flux guide unacceptable since a remainder of the width of the flux guide remains relatively soft for responding to field signals from the rotating magnetic disk. Another way of stating the problem is that with submicron track widths the hard bias renders the flux guide with low permeability. Since a flux guide needs a height of approximately 0.25 μm to 0.5 μm the field signal from the rotating magnetic disk is nonexistent or insignificant at the tunnel junction sensor because of the lack of permeability of the flux guide. Accordingly, there is a strong-felt need to provide a submicron track width tunnel junction sensor with a flux guide that has high permeability.

SUMMARY OF THE INVENTION

The present invention provides a highly permeable flux guide for a submicron tunnel junction sensor. As background, the tunnel junction sensor is recessed from the ABS and has front and back recessed surfaces. The flux guide has a front surface that forms a portion at the ABS and a back surface that is magnetically coupled to the front surface of the tunnel junction sensor. The flux guide is provided with high permeability by making it an antiparallel (AP) coupled structure. The AP coupled structure includes first and second antiparallel (AP) layers and an antiparallel coupling (APC) layer that is located between and interfaces each of the first and second AP layers. Each of the first and second AP layers has a magnetic moment. Magnetic moments of the AP layers are antiparallel with respect to each other and are parallel to the ABS and the major planes of the first and second AP layers. The magnetic moment of one of the first and second AP layers, such as the second AP layer, has a magnetic moment that is greater than the magnetic moment of the other of the first and second AP layers, such as the first AP layer. The free layer of the tunnel junction sensor has a magnetic moment that is parallel to the magnetic moment of the AP layer which has the greater magnetic moment, such as the second AP layer.

With the present invention hard bias layers on each side of the flux guide are not required in order to stabilize the magnetization of the flux guide. The AP coupled flux guide is more stable than a single layer flux guide without hard biasing since the ends of the AP coupled flux guide have reduced demagnetization. This is because of flux closure between the first and second AP layers. The AP flux guide also has high permeability which means that the flux decay length of the field signal from the rotating magnetic disk can be long which improves the efficiency of the read head. The effective thickness of the AP flux guide is the difference in the thicknesses of the first and second AP layers. For instance, if the first AP layer is 50 Å thick and the second AP layer is 200 Å thick the effective thickness is 150 Å. Assuming that the uniaxial anisotropy $H_K$ for each layer is 5 Å the uniaxial anisotropy $H_K$ for the AP flux guide can be calculated by the formula $H_K=(H_{K1}t_1+H_{K2}t_2)\div(t_2-t_1)$. With the above parameters $H_K=5\times50+5\times200\div200-50=8.2$ Oe. Accordingly, the effective uniaxial anisotropy $H_K$ of the AP flux guide is 8.2 Oe which renders the AP flux guide relatively soft with high permeability.

An object of the present invention is to provide a submicron track width tunnel junction sensor with a highly permeable flux guide.

Other objects and attendant advantages of the invention will be appreciated upon reading the following description taken together with the accompanying drawings.

DESCRIPTION OF THE PREFERRED EMBODIMENTS

Magnetic Disk Drive

Figures 1, 2:
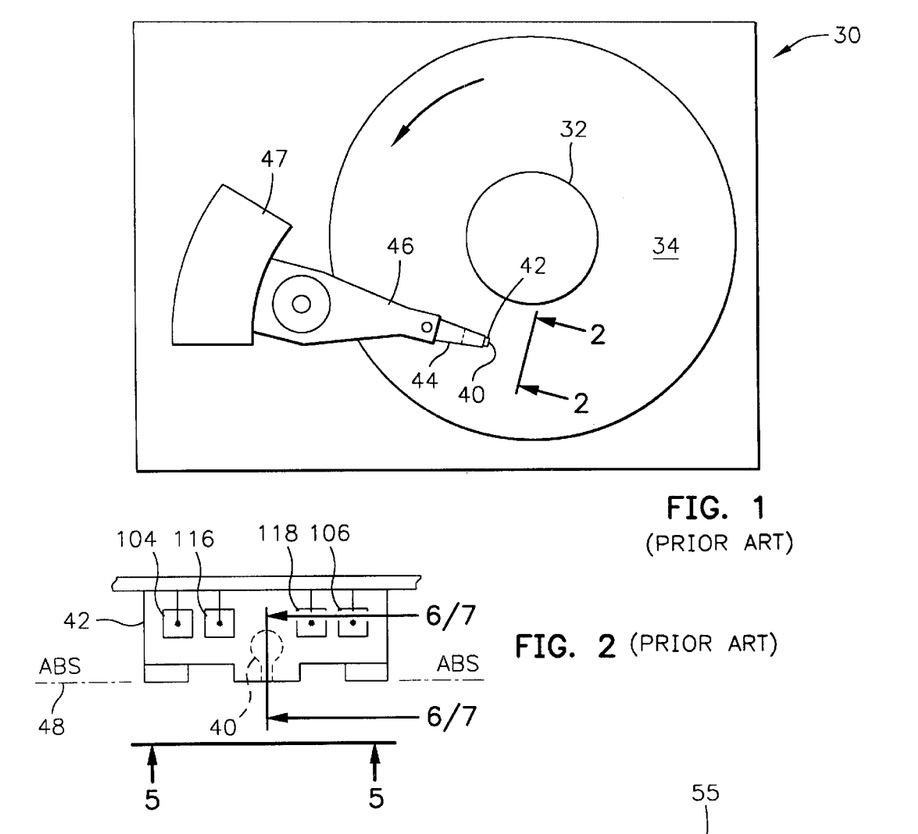
FIG. 1 is a plan view of an exemplary magnetic disk drive.
FIG. 2 is an end view of a slider with a magnetic head of the disk drive as seen in plane 2—2 of FIG. 1.
Figure 3:
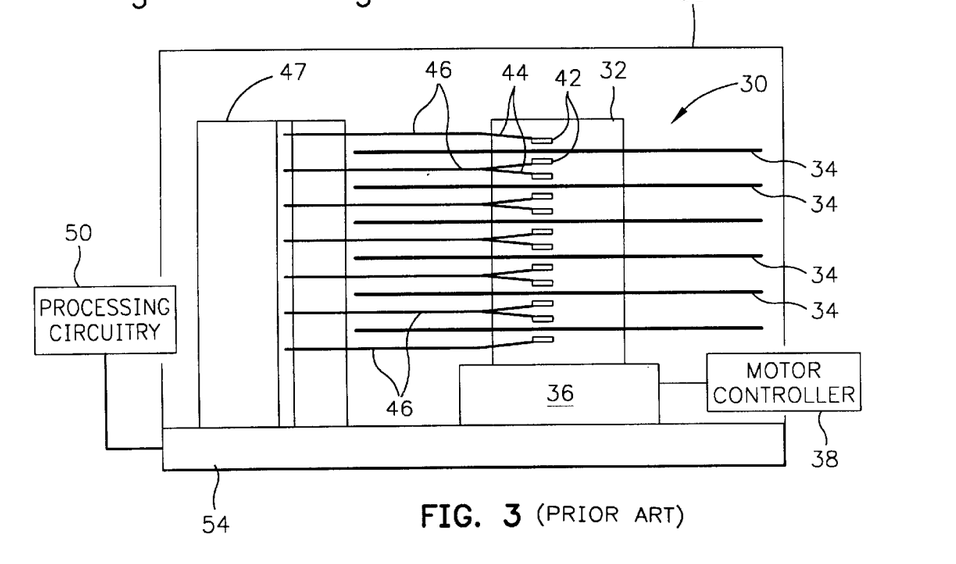
FIG. 3 is an elevation view of the magnetic disk drive wherein multiple disks and magnetic heads are employed.
Figure 4:
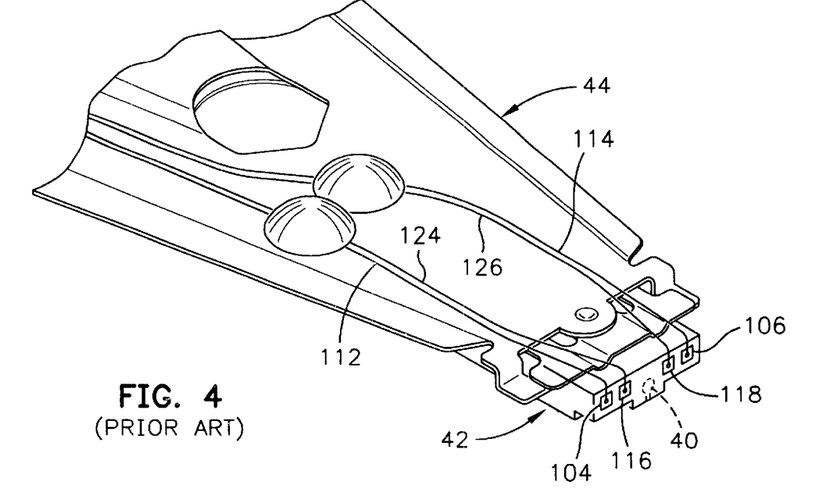
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
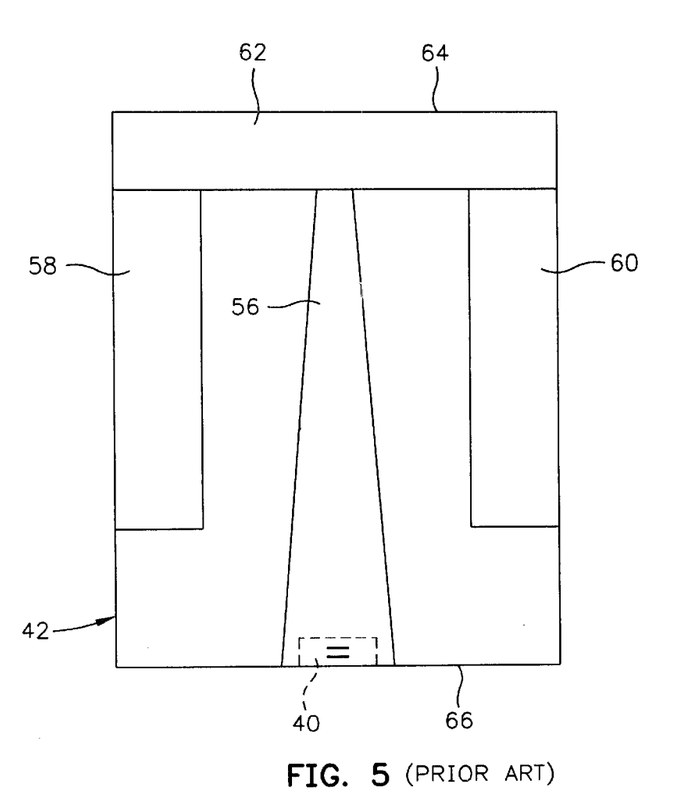
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
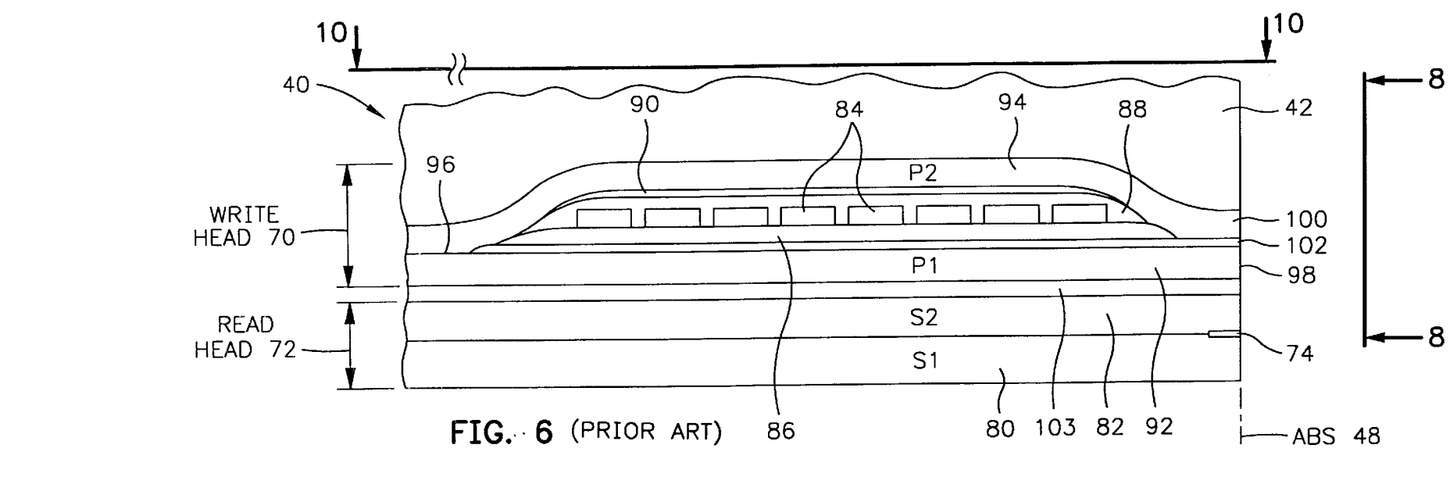
FIG. 6 is a partial view of the slider and a piggyback magnetic head as seen in plane 6—6 of FIG. 2.
Figure 8:
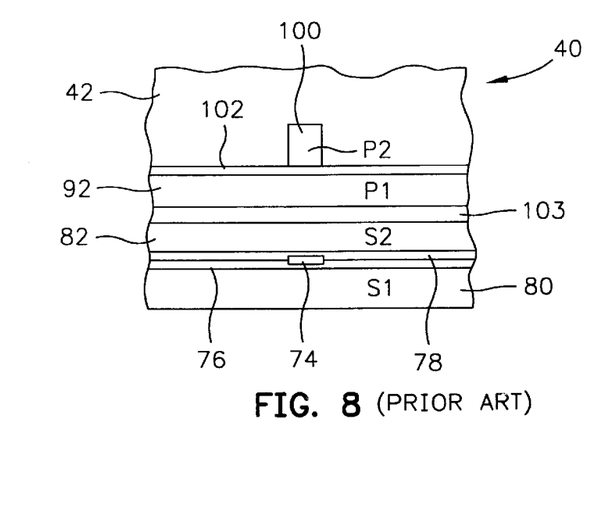
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a tunnel junction sensor 74 of the present invention. FIG. 8 is an ABS view of FIG. 6. The tunnel junction sensor 74 is sandwiched between ferromagnetic first and second shield layers 80 and 82. In response to external magnetic fields, the resistance of the spin valve sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel junction sensor 74 perpendicular to the planes of its film surfaces by the first and second shield layers 80 and 82 which serve as first and second leads.

Figure 10:
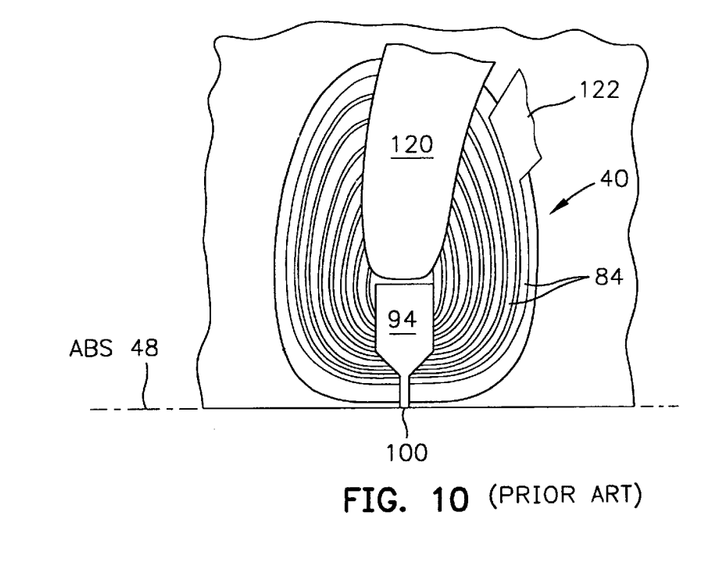
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
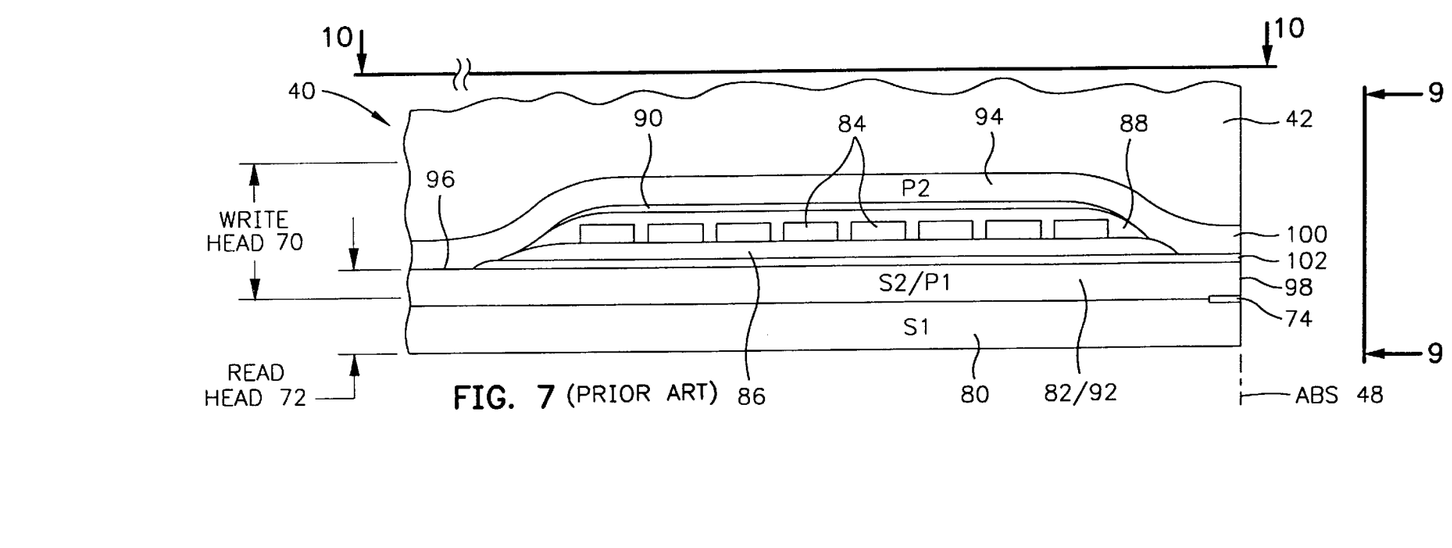
FIG. 7 is a partial view of the slider and a merged magnetic head as seen in plane 7—7 of FIG. 2.
Figure 9:
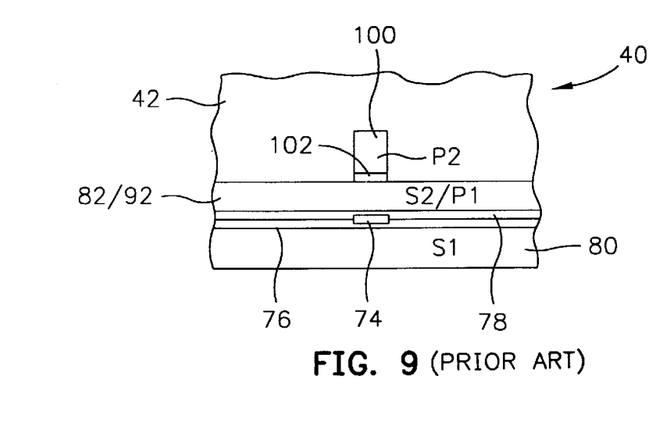
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

The Invention

Figure 11:
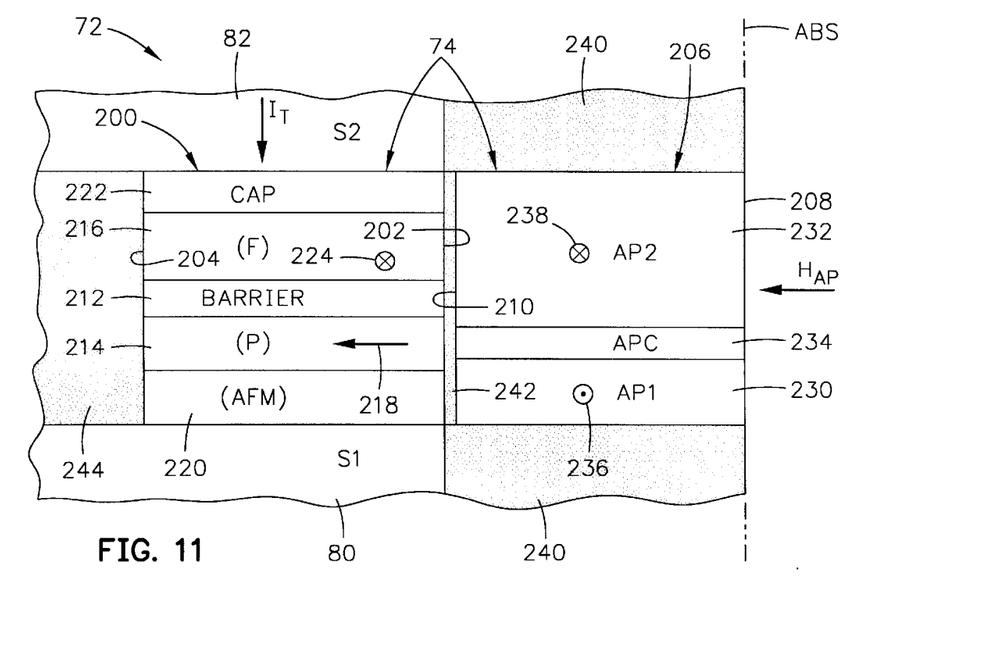
FIG. 11 is a longitudinal cross-section of the present tunnel junction read head.

FIG. 11 is a longitudinal cross-sectional view of the present read head 72 with the sensor 74 located between the first and second shield layers 80 and 82. A tunnel junction sensor 200 has front and back surfaces 202 and 204 and is recessed in the head from the ABS. A flux guide 206 has front and back surfaces 208 and 210 wherein the front surface 208 forms a portion of the ABS and the back surface 210 is magnetically coupled to the front surface 202 of the tunnel junction sensor 200.

The tunnel junction sensor has an electrically nonconductive barrier layer 212 which is located between a pinned layer (P) 214 and a free layer (F) 216. The pinned layer 214 has a magnetic moment 218 which is pinned by an antiferromagnetic (AFM) pinning layer 220 perpendicular to the ABS in a direction from left to right or from right to left, as shown in FIG. 11. A cap layer 222 may be provided on top of the free layer 216 for protecting it from subsequent processing steps. The free layer 216 has a magnetic moment 224 which is oriented parallel to the ABS and to the major planes of the layers. When a field signal $H_{AP}$ from a rotating magnetic disk is sensed by the tunnel junction sensor 200 the magnetic moment 224 of the free layer rotates. When the free layer 224 is rotated upwardly into the head by the field signal from the rotating magnetic disk the magnetic moments 224 and 218 become more parallel which reduces the resistance of the sensor to a tunneling current $I_T$ and when the field signal from the rotating magnetic disk rotates the magnetic moment 224 outwardly from the head, the magnetic moments 224 and 218 become more antiparallel which increases the resistance of the tunnel junction sensor to the tunneling current $I_T$. These increases and decreases in the resistance of the tunnel junction sensor are processed as playback signals by the processing circuitry 50 in FIG. 3. The tunneling current $I_T$ may be conducted through the tunnel junction sensor by the first and second shield layers 80 and 82 which are electrically conductive. The connection of the source of the tunneling current $I_T$ to the first and second shield layers is not shown.

Figure 12:
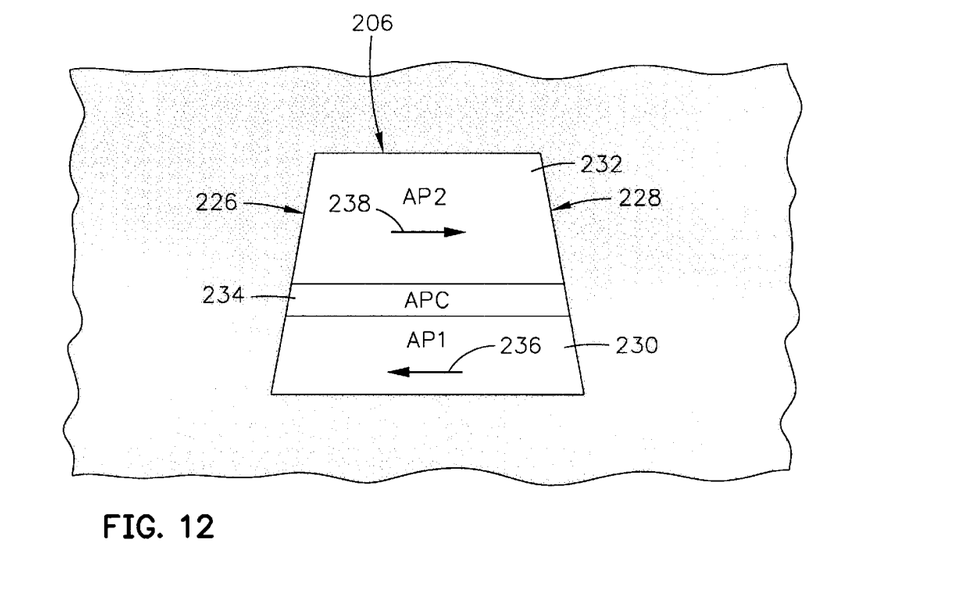
FIG. 12 is an ABS illustration of the tunnel junction read head.

As shown in FIGS. 11 and 12, the flux guide 206 is an antiparallel (AP) coupled structure without any hard bias layers at the first and second side surfaces 226 and 228 for stabilization. The AP coupled flux guide 206 is self-stabilized. The AP coupled flux guide 206 includes first and second antiparallel (AP) layers (AP1) and (AP2) 230 and 232 and an antiparallel coupling (APC) layer 234. The APC layer 234 is located between and interfaces each of the first and second AP layers 230 and 232. The first AP layer 230 has a magnetic moment 236 and the second AP layer has a magnetic moment 238 wherein each of the magnetic moments 236 and 238 are oriented parallel to the ABS and to the major planes of the layers. By strong antiparallel coupling between the first and second AP layers the magnetic moments 236 and 238 are antiparallel with respect to each other. Accordingly, there is flux closure between the first and second AP pinned layers 230 and 232 which highly stabilizes the AP flux guide 206. Further, because of the lack of hard bias layers at the side surface 226 and 228 of the AP flux guide the ferromagnetic materials of the first and second AP coupled layers remain magnetically soft. A preferred material for the first and second AP layers 230 and 232 is nickel iron ($Ni_{83}Fe_{17}$). The APC layer 234 is typically ruthenium (Ru).

The magnetic moment 238 of one of the AP layers, such as the second AP layer 232, has a greater magnetic moment than the magnetic moment 236 of the other AP layer, such as the first AP layer 230. Assuming that the magnetic moment 238 is oriented into the paper, as shown in FIG. 11, the net magnetic moment, which is the difference between the magnetic moments 236 and 238, will be oriented into the paper and parallel to the magnetic moment 224 of the free layer. Accordingly, as the field signal $H_{AP}$ from the rotating magnetic disk rotates the net magnetic moment of the AP flux guide 206 upwardly into the head the magnetic moment 224 of the free layer will likewise be rotated upwardly into the head or vice versa.

The flux guide 206 is insulated on all sides except the side that faces a portion of the ABS. An insulation layer 240, which may be multiple layers, provides insulation about the flux guide 206 and an insulation layer 242 insulates the back surface 210 of the flux guide from the front surface 202 of the tunnel junction sensor. Another insulation layer 244, which may be multiple layers, insulates the back surface 204 of the tunnel junction sensor. Each of the insulation layers may be aluminum oxide. The insulation layer 242 should be thin, such as 10 Å to 20 Å. Sufficient insulation may be obtained at 242 by oxidizing the front edges of the tunnel junction sensor.

Discussion

The materials for the layers of the tunnel junction sensor 200 may be platinum manganese for the pinning layer 220, cobalt iron for the pinned layer 214, aluminum oxide for the barrier layer 212, nickel iron for the free layer 216 and tantalum for the cap layer 222.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
   a tunnel junction sensor that has front and back surfaces that are recessed from said ABS;
   a flux guide having a front surface that forms a portion of said ABS and a back surface magnetically coupled to the front surface of the tunnel junction sensor;
   the flux guide being an antiparallel coupled structure which includes:
   first and second antiparallel (AP) layers; and
   an antiparallel coupling (APC) layer located between and interfacing each of the first and second AP layers.

2. A magnetic read head as claimed in claim 1 including:
   ferromagnetic first and second shield layers; and
   the tunnel junction sensor being located between the first and second shield layers.

3. A magnetic read head as claimed in claim 2 including:
   each of the first and second AP layers having a magnetic moment; and
   the magnetic moments of the AP layers being antiparallel with respect to each other and being parallel to the ABS and major planes of the first and second AP layers.

4. A magnetic read head as claimed in claim 3 further including:
   the tunnel junction sensor including:
      a ferromagnetic pinned layer that has a magnetic moment;
      an antiferromagnetic pinning layer exchange coupled to the pinned layer for pinning the magnetic moment of the pinned layer;
      a ferromagnetic free layer which has a magnetic moment; and
      a nonmagnetic electrically insulative barrier layer located between the free layer and the pinned layer;
      the magnetic moment of one of the first and second AP layers having a magnetic moment that is greater than the magnetic moment of the other of the first and second AP layers; and
      the free layer having a magnetic moment that is parallel to the magnetic moment of the AP layer which has the greater magnetic moment.

5. A magnetic head assembly having an air bearing surface (ABS), comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a first shield layer;
      a tunnel junction sensor located between the first shield layer and the first pole piece layer;
      the tunnel junction sensor that having front and back surfaces that are recessed from said ABS;
      a flux guide having a front surface that forms a portion of said ABS and a back surface magnetically coupled to the front surface of the tunnel junction sensor;
      the flux guide being an antiparallel coupled structure which includes:
         first and second antiparallel (AP) layers; and
         an antiparallel coupling (APC) layer located between and interfacing each of the first and second AP layers.

6. A magnetic head assembly as claimed in claim 5 including:
   a ferromagnetic second shield layer;
   a nonmagnetic isolation layer located between the second shield layer and the first pole piece layer.

7. A magnetic head assembly as claimed in claim 5 including:
   each of the first and second AP layers having a magnetic moment; and
   the magnetic moments of the AP layers being antiparallel with respect to each other and being parallel to the ABS and major planes of the first and second AP layers.

8. A magnetic head assembly as claimed in claim 7 further including:
   the tunnel junction sensor including:
      a ferromagnetic pinned layer that has a magnetic moment;
      an antiferromagnetic pinning layer exchange coupled to the pinned layer for pinning the magnetic moment of the pinned layer;
      a ferromagnetic free layer which has a magnetic moment; and
      a nonmagnetic electrically insulative barrier layer located between the free layer and the pinned layer;
      the magnetic moment of one of the first and second AP layers having a magnetic moment that is greater than the magnetic moment of the other of the first and second AP layers; and
      the free layer having a magnetic moment that is parallel to the magnetic moment of the AP layer which has the greater magnetic moment.

9. A magnetic disk drive including at least one magnetic head assembly that has an a write head, a read head and an air bearing surface (ABS) comprising:
   the write head including:
      ferromagnetic first and second pole piece layers that have a yoke portion located between a pole tip portion and a back gap portion;
      a nonmagnetic write gap layer located between the pole tip portions of the first and second pole piece layers
      an insulation stack with at least one coil layer embedded therein located between the yoke portions of the first and second pole piece layers; and
      the first and second pole piece layers being connected at their back gap portions; and the read head including:
      a first shield layer;
      a tunnel junction sensor located between the first shield layer and the first pole piece layer;
      the tunnel junction sensor having front and back surfaces that are recessed from said ABS;
      a flux guide having a front surface that forms a portion of said ABS and a back surface magnetically coupled to the front surface of the tunnel junction sensor;
      the flux guide being an antiparallel coupled structure which includes:

first and second antiparallel (AP) layers; and an antiparallel coupling (APC) layer located between and interfacing each of the first and second AP layers;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

10. A magnetic disk drive as claimed in claim 9 including:

a ferromagnetic second shield layer;

a nonmagnetic isolation layer located between the second shield layer and the first pole piece layer.

11. A magnetic disk drive as claimed in claim 9 including:

each of the first and second AP layers having a magnetic moment; and the magnetic moments of the AP layers being antiparallel with respect to each other and being parallel to the ABS and major planes of the first and second AP layers.

12. A magnetic disk drive as claimed in claim 11 further including:

the tunnel junction sensor including:

a ferromagnetic pinned layer that has a magnetic moment;

an antiferromagnetic pinning layer exchange coupled to the pinned layer for pinning the magnetic moment of the pinned layer;

a ferromagnetic free layer which has a magnetic moment; and a nonmagnetic electrically insulative barrier layer located between the free layer and the pinned layer;

the magnetic moment of one of the first and second AP layers having a magnetic moment that is greater than the magnetic moment of the other of the first and second AP layers; and the free layer having a magnetic moment that is parallel to the magnetic moment of the AP layer which has the greater magnetic moment.

13. A method of making a magnetic read head which has an air bearing surface (ABS), comprising the steps of:

forming a tunnel junction sensor that has front and back surfaces that are recessed from said ABS;

forming a flux guide having a front surface that forms a portion of said ABS and a back surface magnetically coupled to the front surface of the tunnel junction sensor;

the flux guide being an antiparallel coupled structure which includes:

forming first and second antiparallel (AP) layers; and forming an antiparallel coupling (APC) layer between and interfacing each of the first and second AP layers.

14. A method of making a magnetic read head as claimed in claim 13 including the steps of:

forming ferromagnetic first and second shield layers; and forming the tunnel junction sensor between the first and second shield layers.

15. A method of making a magnetic read head as claimed in claim 14 including:

forming each of the first and second AP layers with a magnetic moment; and forming the magnetic moments of the AP layers antiparallel with respect to each other and parallel to the ABS and major planes of the AP layers.

16. A method of making a magnetic read head as claimed in claim 15 including the steps of:

a making of the tunnel junction sensor including the steps of:

forming a ferromagnetic pinned layer that has a magnetic moment;

forming an antiferromagnetic pinning layer exchange coupled to the pinned layer for pinning the magnetic moment of the pinned layer;

forming a ferromagnetic free layer which has a magnetic moment; and forming a nonmagnetic electrically insulative barrier layer between the free layer and the pinned layer;

forming the magnetic moment of one of the first and second AP layers with a magnetic moment that is greater than the magnetic moment of the other first and second AP layers; and forming the free layer with a magnetic moment that is parallel to the magnetic moment of the AP layer which has the greater magnetic moment.

17. A method of making magnetic head assembly that has an air bearing surface (ABS), comprising the steps of:

making a write head including the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:

forming a first shield layer; and forming a tunnel junction sensor between the first shield layer and the first pole piece layer;

forming the tunnel junction sensor with front and back surfaces that are recessed from said ABS;

forming a flux guide with a front surface that forms a portion of said ABS and a back surface magnetically coupled to the front surface of the tunnel junction sensor;

the flux guide being an antiparallel coupled structure which includes:

forming first and second antiparallel (AP) layers; and forming an antiparallel coupling (APC) layer between and interfacing each of the first and second AP layers.

18. A method of making a magnetic head assembly as claimed in claim 17 further including the steps of:

forming a ferromagnetic second shield layer;

forming a nonmagnetic isolation layer between the second shield layer and the first pole piece layer.

19. A method of making a magnetic head assembly as claimed in claim 17 including:

forming each of the first and second AP layers with a magnetic moment; and forming the magnetic moments of the AP layers antiparallel with respect to each other and parallel to the ABS and major planes of the AP layers.

20. A method of making a magnetic head assembly as claimed in claim 19 including the steps of:

a making of the tunnel junction sensor including the steps of:

forming a ferromagnetic pinned layer that has a magnetic moment;

forming an antiferromagnetic pinning layer exchange coupled to the pinned layer for pinning the magnetic moment of the pinned layer;

forming a ferromagnetic free layer which has a magnetic moment; and forming a nonmagnetic electrically insulative barrier layer between the free layer and the pinned layer;

forming the magnetic moment of one of the first and second AP layers with a magnetic moment that is greater than the magnetic moment of the other first and second AP layers; and forming the free layer with a magnetic moment that is parallel to the magnetic moment of the AP layer which has the greater magnetic moment.

* * * * *